United States Patent
Qiu et al.

(10) Patent No.: US 9,939,172 B2
(45) Date of Patent: Apr. 10, 2018

(54) THERMOSTATIC CONDENSING GAS WATER HEATER AND CONTROL METHOD THEREFOR

(71) Applicant: A. O. Smith Corporation, Milwaukee, WI (US)

(72) Inventors: Bu Qiu, Jiangsu (CN); Dayan Bi, Jiangsu (CN); Sujuan Zhou, Jiangsu (CN); Shiping Zhang, Jiangsu (CN); Yuehua Wu, Jiangsu (CN)

(73) Assignee: A. O. Smith Corporation, Milwaukee, WI (US)

( * ) Notice: Subject to any disclaimer, the term of this patent is extended or adjusted under 35 U.S.C. 154(b) by 480 days.

(21) Appl. No.: 14/357,158

(22) PCT Filed: Oct. 17, 2012

(86) PCT No.: PCT/CN2012/083077
§ 371 (c)(1),
(2) Date: May 8, 2014

(87) PCT Pub. No.: WO2013/067880
PCT Pub. Date: May 16, 2013

(65) Prior Publication Data
US 2015/0059732 A1    Mar. 5, 2015

(30) Foreign Application Priority Data
Nov. 10, 2011  (CN) .......................... 2011 1 0354438

(51) Int. Cl.
*F24H 9/20*    (2006.01)
*F24H 9/00*    (2006.01)
(Continued)

(52) U.S. Cl.
CPC ............... *F24H 8/00* (2013.01); *F24H 1/107* (2013.01); *F24H 1/145* (2013.01); *F24H 9/0005* (2013.01); *F24H 9/2035* (2013.01); *Y02B 30/102* (2013.01)

(58) Field of Classification Search
CPC .... F24H 9/2028; F24H 9/2035; F24H 9/0005; F24H 8/00; F24H 1/107; Y02B 30/102;
(Continued)

(56) References Cited

U.S. PATENT DOCUMENTS

2008/0006226 A1   1/2008  Takeda et al.
2008/0061160 A1   3/2008  Ootomo et al.
(Continued)

FOREIGN PATENT DOCUMENTS

CN        1296156        5/2001
CN       101196342       6/2008
(Continued)

OTHER PUBLICATIONS

First Office Action from the State Intellectual Property Office of China for Application No. 201110354438.6 dated Feb. 28, 2013 (8 pages).
(Continued)

*Primary Examiner* — Steven B McAllister
*Assistant Examiner* — Steven Anderson, II
(74) *Attorney, Agent, or Firm* — Michael Best & Friedrich LLP

(57) ABSTRACT

A thermostatic condensing gas water heater, comprising a burner; a first heat exchanger (7), a second heat exchanger (4), a water inlet pipe (10), and a water outlet pipe (9) provided in succession along the flow direction of the burnt flue gas; a controller; and a water flow channel connecting the first heat exchanger (7) and the second heat exchanger (4) in parallel between the water inlet pipe (10) and the water outlet pipe (9), wherein flow control valves (3, 5) capable of adjusting the water flow distribution of the first heat exchanger (7) and the second heat exchanger (4) are provided on the water flow channel and controlled by the controller.

5 Claims, 4 Drawing Sheets

(51) Int. Cl.
*F24H 1/10* (2006.01)
*F24H 8/00* (2006.01)
*F24H 1/14* (2006.01)

(58) Field of Classification Search
CPC .............. Y02B 30/108; F28F 2210/04; F28F 2210/02; F28F 2210/08; F28F 2210/10; B60H 2001/00164; B60H 2001/00171
See application file for complete search history.

(56) References Cited

U.S. PATENT DOCUMENTS

| | | | |
|---|---|---|---|
| 2010/0111508 A1 | 5/2010 | Ding et al. | |
| 2012/0138149 A1* | 6/2012 | Hatada | F24H 1/10 137/1 |
| 2012/0325165 A1* | 12/2012 | Hicks | F22G 5/20 122/471 |

FOREIGN PATENT DOCUMENTS

| | | | | |
|---|---|---|---|---|
| CN | 101424447 | | 5/2009 | |
| CN | 101619894 | * | 1/2010 | |
| CN | 201476300 | | 5/2010 | |
| CN | 201476301 | * | 5/2010 | |
| CN | 201637065 | | 11/2010 | |
| CN | 201903169 | | 7/2011 | |
| CN | 102367990 | | 3/2012 | |
| CN | 202303898 | | 7/2012 | |
| FR | 2539849 A2 | * | 7/1984 | .............. F24H 8/00 |
| GB | 446363 A | * | 4/1936 | .............. F22G 5/20 |
| JP | 06272966 | | 9/1994 | |
| JP | 10300193 | | 11/1998 | |
| JP | H10300193 | * | 11/1998 | |
| WO | 2013067880 | | 5/2013 | |

OTHER PUBLICATIONS

Second Office Action from the State Intellectual Property Office of China for Application No. 201110354438.6 dated Jul. 5, 2013 (6 pages).

Office Action from the Canadian Intellectual Property Office for Application No. 2854876 dated Aug. 3, 2015 (4 pages).

* cited by examiner

THERMOSTATIC CONDENSING GAS WATER HEATER AND CONTROL METHOD THEREFOR

FIELD OF THE INVENTION

The present invention relates to a water heater and a control method therefor, and particularly, to a thermostatic condensing gas water heater and a control method therefor, which belong to the technical field of gas appliances.

BACKGROUND OF THE INVENTION

As known to the applicant, the existing gas instantaneous water heaters all have the problem of "coldwater sandwich", i.e., during the usage of the hot water, when the user turns on the water again in a short time after it is turned off, the outlet water temperature of the water heater fluctuates due to the reasons such as the ignition preparation delay during startup, the water temperature rise during shutdown, etc., and especially the water temperature drops suddenly. This phenomenon is particularly apparent in winter, and the user's comfort in using the water heater is greatly influenced. In order to solve the problem, most of the water heater manufacturers adopt auxiliary heating measures such as utilizing the recycled water by adding a water pump, or connecting the water heater in series with a small electronic water heater which is often referred to Little Kitchen Aid, but the user's investment cost is obviously increased.

SUMMARY OF THE INVENTION

The object of the present invention is to propose, with respect to the above defects in the prior art, a thermostatic condensing gas water heater which can eliminate the phenomenon of a rapid temperature drop when the water is turned on again in a short time after it is turned off during the usage of the water heater, almost without increasing the cost, and provide corresponding control method therefor.

In order to achieve the above object, a thermostatic condensing gas water heater of the present invention comprising: a burner; a first heat exchanger (main heat exchanger), a second heat exchanger (condensing heat exchanger), a water inlet pipe, and a water outlet pipe provided in succession along the flow direction of the burnt flue gas; and a controller, wherein the thermostatic condensing gas water heater further comprising: a water flow channel connecting the first heat exchanger and the second heat exchanger in parallel between the water inlet pipe and the water outlet pipe, wherein flow control valves capable of adjusting the water flow distribution of the first heat exchanger and the second heat exchanger are provided on the water flow channel and controlled by the controller.

The present invention makes a further improvement that the second heat exchanger is a housing-and-tube heat exchanger which enables a housing to be communicated with the water inlet pipe and the water outlet pipe, and enables the burnt flue gas to pass through a pipeline in the housing.

During working, the controller acquires an outlet water temperature Te of the first heat exchanger and an outlet water temperature Tc of the second heat exchanger, reads a set temperature Ts (usually set by the user), and adjusts the flow control valves according to Te and Tc, so that an outlet water temperature To of the water outlet pipe approaches the set temperature Ts.

Particularly, the controller adjusts the flow control valves according to a target flow proportion $\beta l=(Ts-Te)/(Tc-Te)$ of the second heat exchanger, so that the outlet water temperature To of the water outlet pipe approaches Ts.

Furthermore, the controller acquires the outlet water temperature To of the water outlet pipe, and adjusts the flow control valves in a predetermined step length according to an actual flow proportion $\beta s=(To-Te)/(Tc-Te)$ of the second heat exchanger, so that $\beta s$ approaches $\beta l$.

In the above process, the controller acquires Te, Tc and To by detecting temperature sensors provided on the first heat exchanger, the second heat exchanger and the water outlet pipe, respectively.

The present invention makes a further improvement that the second heat exchanger is provided with an electrical heating device heating the water in the second heat exchanger and controlled by the controller.

In that case, the controller acquires an outlet water temperature Te of the first heat exchanger and an outlet water temperature Tc of the second heat exchanger, reads a set temperature Ts and a controller preset temperature Ta, $Ta>Ts+\Delta T$, and controls the electrical heating device so that Tc approaches Ta when $Te<Ts+\Delta T$ (a predetermined temperature tolerance).

By using the present invention, the latent heat of vaporization in the burnt flue gas is absorbed through the second heat exchanger (condensing heat exchanger) of the condensing gas water heater to heat the water in the second heat exchanger, without causing any additional cost. In addition, by means of the automatic control of the water flow distribution proportions of the first heat exchanger and the second heat exchanger, the problem that the water temperature drops when the water is turned on again after it is turned off during the usage of the hot water can be solved, so that the temperature of the hot water output from the water heater stably falls within a set temperature range, which ensures the user's comfort in usage and prevents any empyrosis to guarantee the safe usage. It is clear that the present invention not only efficiently utilizes the latent heat of vaporization in the burnt flue gas through the second heat exchanger (condensing heat exchanger) to improve the heat exchanger efficiency of the gas water heater, but also sufficiently utilizes the storage space in the condensing heat exchanger to tactfully solve the problem of "coldwater sandwich" in the usage of the gas instantaneous water heater.

BRIEF DESCRIPTION OF THE DRAWINGS

The present invention is further described as follows with reference to the drawings.

Figure 1:
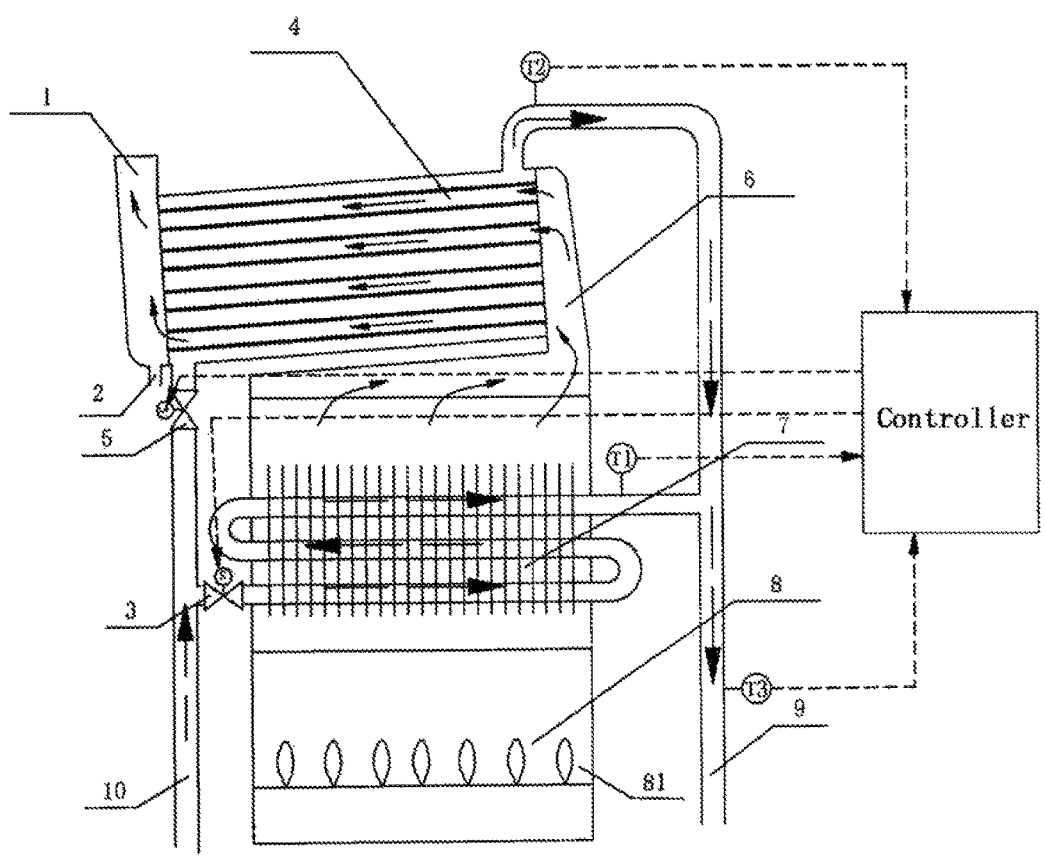
FIG. 1 is a structure diagram of Embodiment 1 of the present invention.

In which,

1: flue gas discharge channel
2: water outlet
3: first flow control valve
4: second heat exchanger
5: second flow control valve
6: gas collection connector
7: first heat exchanger
8: combustion chamber
81: burner 9: water outlet pipe
10: water inlet pipe
11: electrical heating rod
T1: first temperature sensor
T2: second temperature sensor
T3: third temperature sensor

DETAILED DESCRIPTION OF THE PREFERRED EMBODIMENTS

Embodiment 1

The thermostatic condensing gas water heater of the embodiment is as shown in FIG. 1, a first heat exchanger (main heat exchanger) 7 and a second heat exchanger (condensing heat exchanger) 4 are provided in succession along the flow direction of the burnt flue gas of a combustion chamber 8 of a burner 81. The water flow channels of the first heat exchanger 7 and the second heat exchanger 4 are connected in parallel between a water inlet pipe 10 and a water outlet pipe 9, and provided with a first flow control valve 3 and a second flow control valve 5 controlled by a controller to adjust the water flow distribution proportions of the first heat exchanger 7 and the second heat exchanger 4, respectively. The water flow channel outlets of the first heat exchanger 7 and the second heat exchanger 4 are provided with a first temperature sensor T1 and a second temperature sensor T2, respectively, and the water outlet pipe 9 is provided with a third temperature sensor T3. The signal output of each of the temperature sensors is connected to corresponding receiving port of the controller, while the control signal output of the controller is connected to the first flow control valve 3 and the second flow control valve 5.

A gas collection connector 6 is provided between the first heat exchanger 7 and the second heat exchanger 4 to form a flow channel of the flue gas. A condensate water outlet 2 is provided below a flue gas discharge channel 1 of the second heat exchanger 4.

Figure 2:
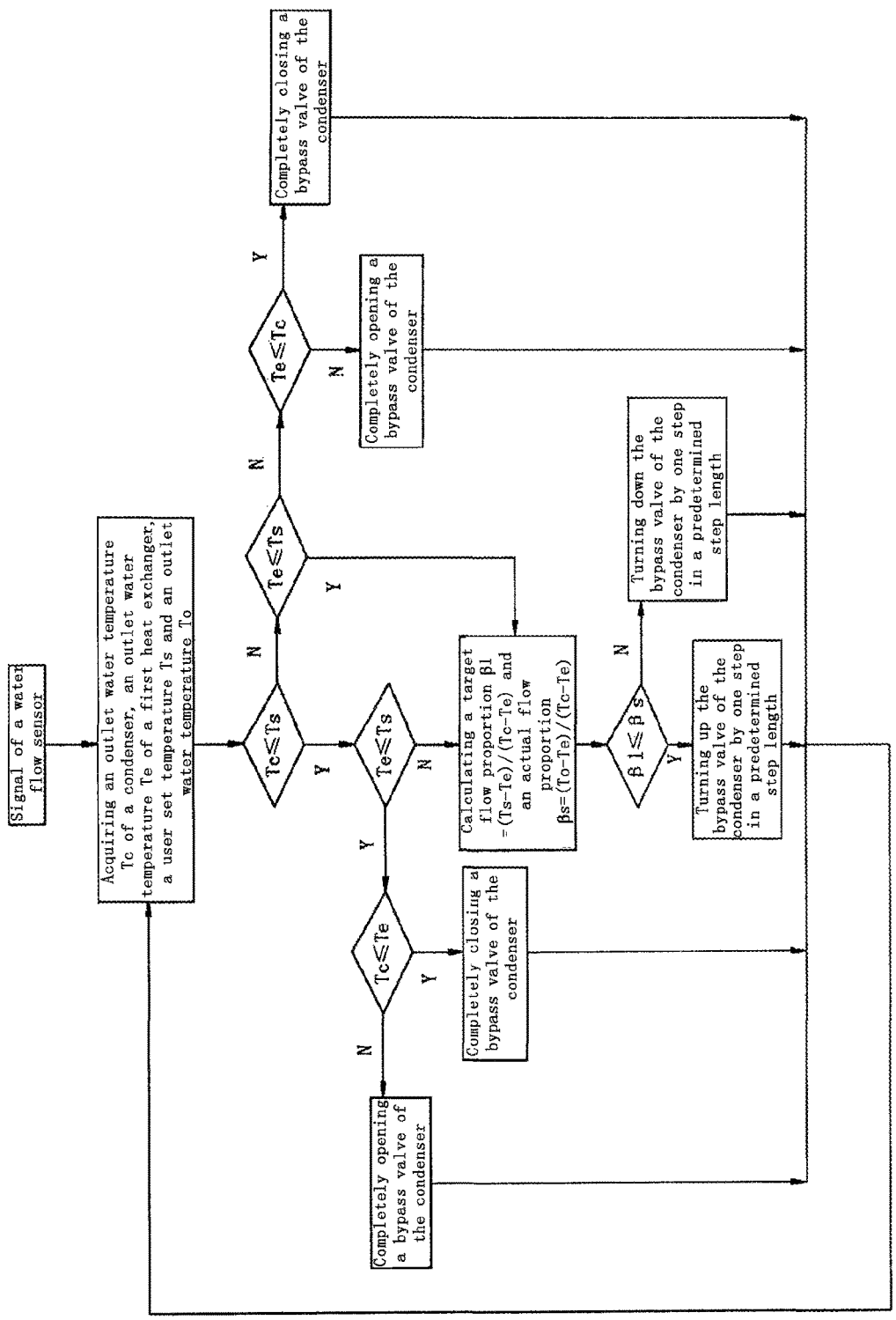
FIG. 2 is a control flowchart of Embodiment 1 of FIG. 1.

During working, as shown in FIG. 2, when a user uses the water, a flow sensor senses a water flow sensing signal. The controller receives the temperature signals Tc, Te and To of respective temperature sensors T2, T1, T3, reads the user set temperature Ts, and controls in the following steps:

Step 1: comparing whether the temperature Tc of the second temperature sensor T2 is less than or equal to the set temperature Ts, and if so, performing step 2; otherwise comparing whether the temperature Te of the first temperature sensor T1 is less than or equal to the set temperature Ts, and if so, performing step 3; otherwise comparing whether the temperature Te of the first temperature sensor T1 is less than or equal to the temperature Tc of the second temperature sensor T2, and if so, completely closing the second flow control valve 5; otherwise completely opening the second flow control valve 5; and then continuing the above comparisons.

Step 2: comparing whether the temperature Te of the first temperature sensor T1 is less than or equal to the set temperature Ts, and if not, performing step 3; otherwise comparing whether the temperature Tc of the second temperature sensor T2 is less than or equal to the temperature Te of the first temperature sensor T1, and if so, completely closing the second flow control valve 5; otherwise completely opening the second flow control valve 5; and then returning to step 1.

Step 3: calculating a target flow proportion $\beta 1$ defined by a ratio of a difference (Ts−Te) between the set temperature and the temperature Te of the first temperature sensor T1 to a difference (Tc−Te) between the temperature Tc of the second temperature sensor T2 and the temperature Te of the first temperature sensor T1; and calculating an actual flow proportion $\beta s$ defined by a ratio of a difference (To−Te) between the temperature To of the third temperature sensor T3 and the temperature Te of the first temperature sensor T1 to the difference (Tc−Te) between the temperature Tc of the second temperature sensor T2 and the temperature Te of the first temperature sensor T1.

Step 4: comparing whether the calculated target flow proportion $\beta 1$ is less than or equal to the actual flow proportion $\beta s$, and if so, increasing the opening of the second flow control valve 5 in a predetermined step length; otherwise decreasing the opening of the second flow control valve 5 in the predetermined step length; and then returning to step 1.

Experiments show that by using the water heater and the control method therefor in the embodiment, the latent heat of vaporization in the burnt flue gas is absorbed through the second heat exchanger (condensing heat exchanger) 4 of the condensing gas water heater to heat the water in the second heat exchanger 4, without causing any additional cost. Through the automatic control of the water flow distribution proportions of the first heat exchanger 7 and the second heat exchanger 4 by the first and second flow control valves 3, 5, the problem that the water temperature drops when the water is turned on again in a short time (e.g., 3-5 minutes) after it is turned off during the usage of the water heater can be solved, so that the temperature of the hot water output from the water heater stably falls within a range of the set temperature±3° C., which greatly improves the user's comfort in usage and prevents any empyrosis to guarantee the safe usage.

Embodiment 2

Figure 3:
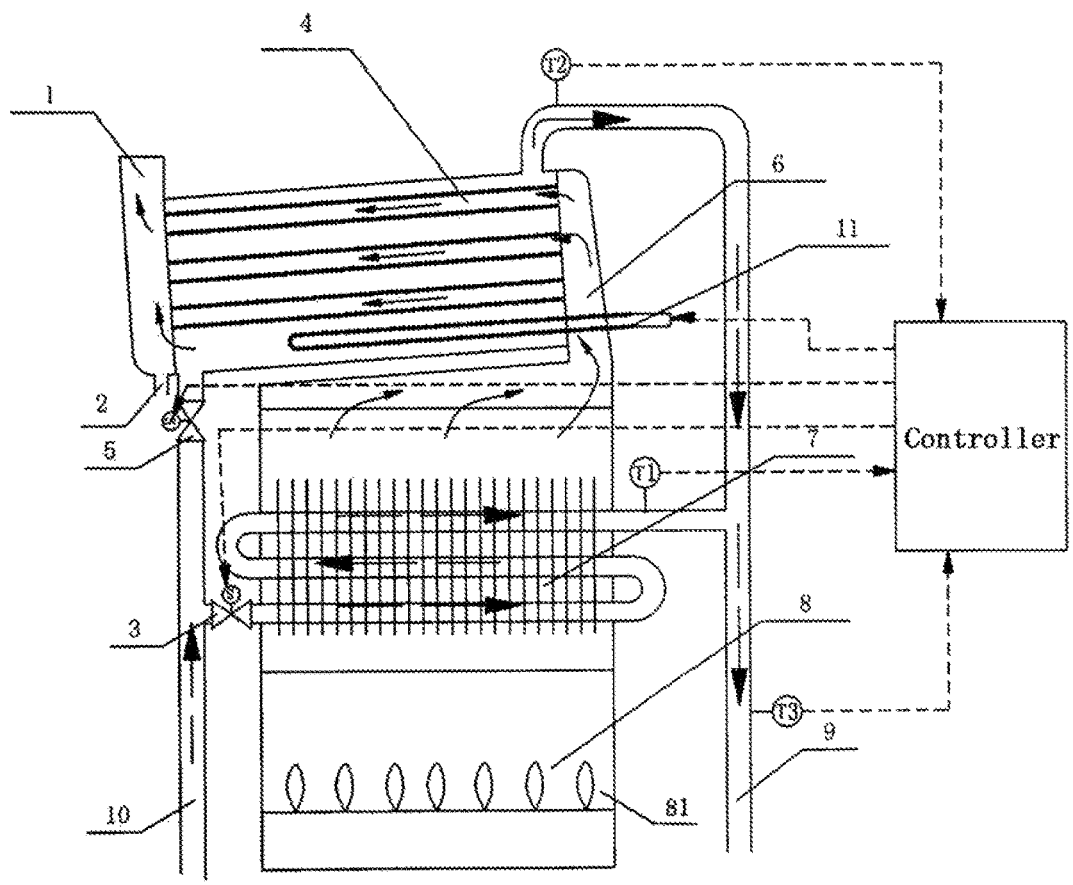
FIG. 3 is a structure diagram of Embodiment 2 of the present invention.

The thermostatic condensing gas water heater of the embodiment is as shown in FIG. 3, and its basic structure is same as that of Embodiment 1, except that the second heat exchanger 4 is provided with an electrical heating rod 11 heating water therein and controlled by a controller.

Figure 4:
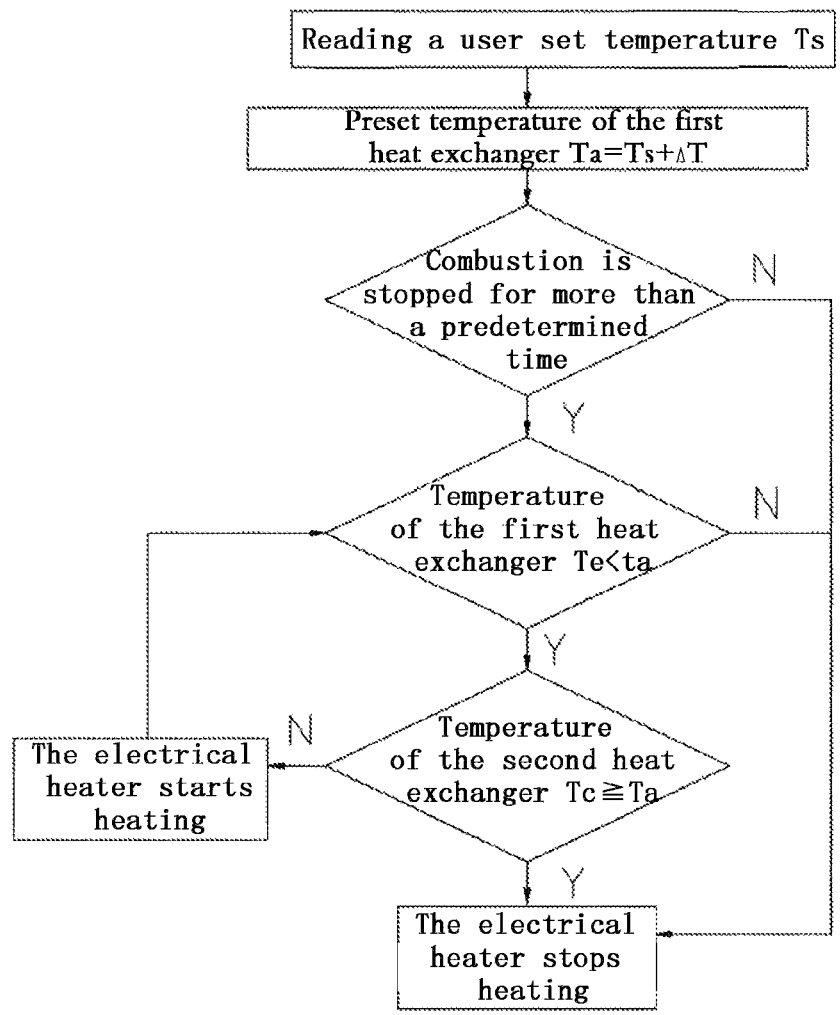
FIG. 4 is a control flowchart of Embodiment 2 of FIG. 3.

During working, the controller acquires a temperature Te from a first temperature sensor T1 and a temperature Tc from a second temperature sensor T2, and reads a set temperature Ts and a controller preset temperature Ta (Ta=Ts+$\Delta$T, $\Delta$T is a predetermined temperature tolerance). When Te<Ta and Tc<Ta, the controller controls the electrical heating device, so that the temperature Tc of the second temperature sensor T2 approaches the controller preset temperature Ta. Please refer to FIG. 4 for the specific control flow, wherein it is judged that "combustion is stopped for more than a predetermined time" because the combustion afterheat can continue heating the heat exchanger within a certain time (e.g., 5 minutes), without starting the electrical heating. Other processes are easily understandable with reference to the above description, and herein are omitted.

After the water heater and the control method of the embodiment are adopted, the outlet water temperature Tc of the second heat exchanger 4 is maintained at the preset temperature Ta when the user does not use the water. When the user starts to use the water, the water flow distribution proportions of the first heat exchanger 7 and the second heat exchanger 4 are adjusted through the control method of Embodiment 1, so as to solve the discomfort caused by the "cold water section" in the water heater when the user starts to use the water.

The present invention may have other embodiments besides the above ones, e.g., the condensing heat exchanger may be a bellows heat exchanger. Any technical solution formed through an equivalent replacement or transform falls within the protection scope of the present invention.

What is claimed is:

1. A thermostatic condensing gas water heater, comprising: a burner; a first heat exchanger, and a second heat exchanger provided in succession along the flow direction of the burnt flue gas; a water inlet pipe; a water outlet pipe; and a controller, the thermostatic condensing gas water heater further comprising: a water flow channel connecting the first heat exchanger and the second heat exchanger in parallel between the water inlet pipe and the water outlet pipe, wherein flow control valves for adjusting water flow distribution of the first heat exchanger and the second heat exchanger are provided on the water flow channel and controlled by the controller;

wherein the controller acquires an outlet water temperature (Te) of the first heat exchanger and an outlet water temperature (Tc) of the second heat exchanger, reads a set temperature (Ts), and adjusts the flow control valves according to the outlet water temperature of the first heat exchanger and the outlet water temperature of the second heat exchanger, so that an outlet water temperature (To) of the water outlet pipe approaches the set temperature (Ts);

wherein the controller adjusts the flow control valves to increase water flow from the second heat exchanger to the water outlet pipe when the outlet water temperature (Te) of the first heat exchanger is less than both the outlet water temperature (Tc) of the second heat exchanger and the set temperature (Ts).

2. The thermostatic condensing gas water heater according to claim 1, wherein the second heat exchanger is a housing-and-tube heat exchanger which enables its housing to be communicated with the water inlet pipe and the water outlet pipe, and enables the burnt flue gas to pass through a pipeline in the housing.

3. The thermostatic condensing gas water heater according to claim 1, wherein the flow control valves comprise a first flow control valve provided in a water flow channel of the first heat exchanger and a second flow control valve provided in a water flow channel of the second heat exchanger, and the controller adjusts the first flow control valve and the second flow control valve according to a target flow proportion ($\beta l=(Ts-Te)/(Tc-Te)$) of the second heat exchanger, so that the outlet water temperature (To) of the water outlet pipe approaches the set temperature (Ts).

4. The thermostatic condensing gas water heater according to claim 3, wherein the controller acquires the outlet water temperature (To) of the water outlet pipe, and adjusts the flow control valves in a predetermined step length according to an actual flow proportion ($\beta s=(To-Te)/(Tc-Te)$) of the second heat exchanger, so that the actual flow proportion ($\beta s$) approaches the target flow proportion ($\beta l$).

5. The thermostatic condensing gas water heater according to claim 1, wherein the controller acquires the outlet water temperature (Te) of the first heat exchanger, the outlet water temperature (Tc) of the second heat exchanger, and the outlet water temperature (To) of the water outlet pipe by detecting temperature sensors provided on the first heat exchanger, the second heat exchanger and the water outlet pipe, respectively.

* * * * *